Oct. 5, 1971  R. S. ODLE, JR., ET AL  3,609,873
CONTROL CIRCUIT TO DEACTIVATE AN APPLIANCE
Filed May 8, 1970
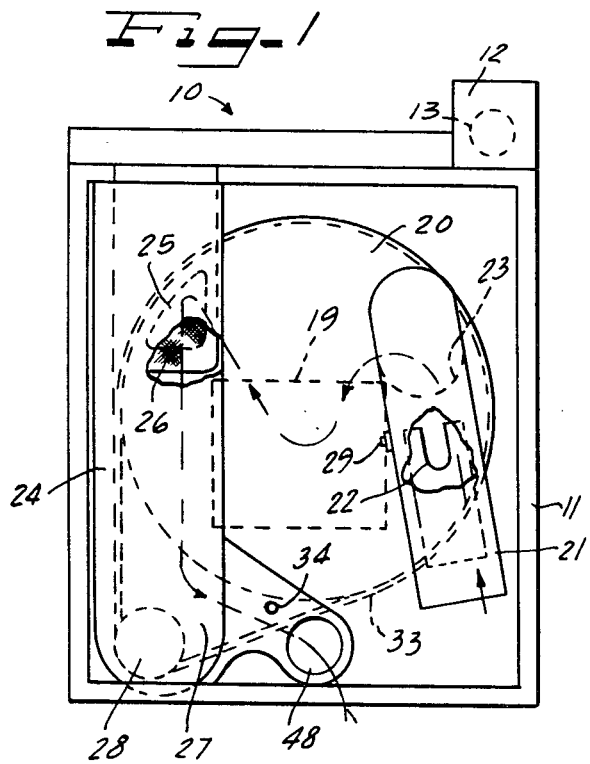
Fig-1
Fig-3
Fig-2
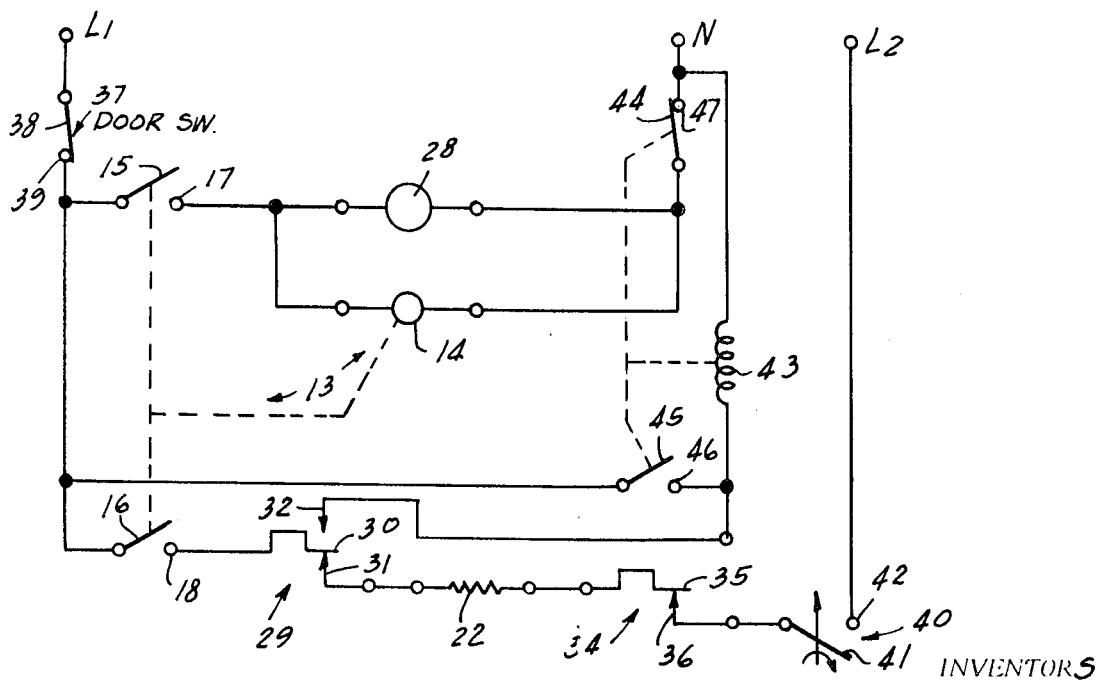
INVENTORS
RALPH S. ODLE, JR.
MARVIN G. STEFFEY
BY
ATTORNEYS United States Patent Office 3,609,873
Patented Oct. 5, 1971

3,609,873
CONTROL CIRCUIT TO DEACTIVATE
AN APPLIANCE
Ralph S. Odle, Jr., Michigan City, Ind., and Marvin G.
Steffey, St. Joseph, Mich., assignors to Whirlpool Corporation, Benton Harbor, Mich.
Filed May 8, 1970, Ser. No. 35,609
Int. Cl. F26b *19/00*
U.S. Cl. 34—48                                    6 Claims

ABSTRACT OF THE DISCLOSURE

A control circuit for a fabric drying appliance includes a relay which is operated in response to contact closure of a heat sensitive switch to deenergize the heater and the drive motor upon detection of a temperature greater than a predetermined temperature adjacent the heater or other machine area. The relay includes contacts which close to establish a holding circuit therefor to prevent energization of the heater and drive motor upon cooling below the predetermined temperature adjacent the heater. A switch is positioned for operation by the access door of the appliance and is serially connected in the holding circuit of the relay in order to promote visual inspection upon the occurrence of an overheated condition by insuring that the access door must be opened and reclosed in order to break the holding circuit and reset the control circuit for normal operation.

BACKGROUND OF THE INVENTION

(1) Field of the invention

This invention relates to a control circuit for deactivating an appliance, and more particularly to a control circuit for stopping operation of an appliance in response to an adverse condition and requiring positive manual operation by an operator to reactivate operation of the appliance.

(2) Description of the prior art

Clothes drying machines and combination washing-drying machines have employed a limit and/or a safety thermostat adjacent the heater assembly or in the fan scroll. Such a thermostat generally includes normally closed contacts in series with a heater which are operated to open the heater circuit when an excessive temperature is detected. A serious drawback resides in the fact that, upon cooling, reclosure of the thermostat contacts effects energization of the heater and the attendant further possibility of damage to the fabrics being dried.

SUMMARY OF THE INVENTION

The control circuit according to the present invention includes apparatus which is operable to deenergize an appliance in response to the occurrence of an adverse operational condition of the appliance. More particularly, a control circuit for a fabric drying appliance includes a thermostat which is positioned adjacent the heater of the appliance or in the fan scroll and which is operable in response to the detection of temperature above a predetermined value to establish an operating circuit for a relay. The relay includes contacts which are serially interposed in the operating circuit of the drive motor of the appliance, which contacts open to effect deenergization of the drive motor. The relay includes a second set of relay contacts which operate to provide a holding circuit for the relay to prevent subsequent energization of the drive motor upon cooling of the area adjacent the heater or fan scroll.

A centrifugal switch which is connected in series with the heater opens as a result of motor deenergization to insure that the heater does not become energized as the temperature adjacent the heater falls to a level at which the thermostat becomes reset.

A switch is serially connected in the holding circuit of the relay for resetting the control circuit for normal operation. Advantageously this switch is operated by the access door of the appliance. The control circuit according to the invention therefore makes it necessary for the operator of the fabric drying appliance to open and close the access door in order to re-energize the appliance following detection of a temperature above the predetermined level. This advantageously affords the operator the opportunity to inspect, and promotes the inspection of, the contents of the drying appliance for damage and/or obstructions.

The control circuit according to the present invention will stop all machine operations and render the machine completely inoperative rather than merely deenergizing the heating means in the event of detection of excess temperatures, thereby assuring that the fabrics being dried within the machine will receive no further damage.

BRIEF DESCRIPTION OF THE DRAWINGS

Other objects, features and advantages of the invention, its orginization, construction and operation will be best understood by reference to the following detailed description of a preferred embodiment thereof taken in conjunction with the accompanying drawings, in which:

FIG. 1 is a rear elevational view of a laundry drying appliance illustrated with the back panel thereof removed;

FIG. 2 is a schematic circuit diagram of a control circuit for use with the appliance illustrated in FIG. 1; and FIG. 3 is a graphic illustration relating switch closings of a control circuit with cycles of the timer of the control circuit of FIG. 2.

DESCRIPTION OF THE PREFERRED EMBODIMENTS

In FIG. 1 of the drawing a clothes drying appliance 10 is illustrated as generally comprising a cabinet 11 having a control console 12 carried thereon and housing a selectively settable timer 13.

The appliance further comprises a heat treating zone in the form of a rotatably mounted drum 20 to which access is provided from the front of the machine through an access door 19.

At the back of the cabinet 11 there is provided a heater duct 21 having a heater 22 mounted therein. The heater duct 21 communicates with the interior of the drum 20 by way of an air inlet 23 to provide a flow of heated air to the interior of the drum.

Also provided at the back of the cabinet 11 is an exhaust duct 24 leading from an exhaust opening 25 to provide a flow of exhaust air from the interior of the drum 20 through a lint screen 26 to an exhaust opening 48 at the rear of the appliance. Air is exhausted from the drum 20 with the aid of a fan (not shown) at reference 27 which is driven by a drive motor 28. The drum 20 is adapted to be rotated by means of a belt 33 which is also driven by the drive motor 28.

A limit thermostat 29 is provided on the heater duct 21 in order to sense the temperature adjacent the heater 22. Also, a control thermostat 34 is provided adjacent the outlet of the fan so as to be responsive to the temperature of the air being exhausted from the appliance 10. FIG. 2 illustrates a control circuit for the appliance 10. Inasmuch as the appliance in this particular embodiment is an electrically heated machine, a three-wire electrical supply is employed as indicated by the input terminals L1, L2 and N.

The heater 22 is connected between the terminal L1 and the terminal L2 by way of appropriate control circuitry while the drive motor 28 and the timer 13 are connected between the terminal L1 and the terminal N.

More specifically, the drive motor 28 is connected between the terminals L1 and N in series with a door operated switch 37 having a movable contact 38 and the stationary contact 39, a movable contact 15 and a stationary contact 17 of the timer 13 and a movable contact 44 and a stationary contact 47 of relay 43. The timer 13 includes a timer motor 14 which is likewise connected between the terminals L1 and N in that it is connected in shunt relation to the drive motor 28.

The heater 22 is connected between the terminals L1 and L2 in series with the door switch 37, a movable contact 16 and a stationary contact 18 of the timer 13, a movable contact 30 and a stationary contact 31 of the limit thermostat 29, a movable contact 35 and a stationary contact 36 of the exhaust control thermostat 34, and a movable contact 41 and a stationary contact 42 of a centrifugal switch 40. The centrifugal switch 40 is associated with the drive motor 28 and is closed when the drive motor 28 is turning at speeds above a predetermined speed.

The safety or limit thermostat 29 is provided with an additional normally open contact 32. The contact 32 is connected to one side of the relay coil 43, the other side of which is connected to the terminal N. Relay coil 43 controls the position of a movable contact 45 to engage and disengage a stationary contact 46, and controls movement of the movable contact 44 for engagement and disengagement with the stationary contact 47.

In particular, the normally open relay contacts 45, 46 are operable to connect the relay coil 43 to the terminal L1 by way of door switch 37 to provide a holding circuit for the relay coil 43, while the normally closed relay contacts 44, 47 are operable to interrupt the powering circuits for the drive motor 28 and the timer motor 14.

In operation, when the machine operator sets the timer 13 to the beginning of the normal or air only drying cycle (FIG. 3) the timer contacts 15, 17 are closed, and the timer contacts 16, 18 are also closed if the normal cycle has been selected. With the door 19 closed, the contacts 38, 39 of the door switch 37 are closed and the drive motor 28 and the timer motor 14 are energized over the previously traced circuits extending between the terminals L1 and N. As soon as the drive motor 28 attains normal speed, the centrifugal switch 40 operates to close its contacts 41, 42 and the heater 22 is energized by way of the door switch 37, the timer contacts 16, 18, the thermostat 29 the thermostat 34 and the centrifugal wsitch 40.

The exhaust thermostat 34 holds the temperature within the drum to a predetermined maximum level by deenergizing the heater 22 when excessive temperatures are detected at the outlet of the fan.

After the time selected by the operator for the particular cycle has elapsed, the timer contact 16 disengages from the timer contact 18 to open the circuit to the heater 22, thereby deenergizing the heater. The timer contacts 15, 17, however, remain closed for an additional interval, for example five minutes, to tumble fabrics in the drum 20 in a cool air stream to lower their temperature so as to preclude the formation of deep-set wrinkles.

In the event that the temperature in the heater duct 21 reaches the point in excess of a predetermined temperature, the limit thermostat 29 operates to disengage its movable contact 30 from the stationary contact 31 and engage the movable contact 30 with the stationary contact 32. This transfer can be caused by a number of conditions, such as a blocked lint screen or a blocked air inlet, or, in an extreme circumstance, a fire within the drum 20. The transfer operation of the limit switch 29 energizes the relay coil 43 over a path including the movable contact 30, and stationary contact 32 of limit thermostat 29.

Energization of the relay winding 43 causes the normally open relay contacts 45, 46 to close providing a holding circuit for the relay winding 43. In addition, the normally closed relay contacts 44, 47 open to deenergize the drive motor 28 and the timer motor 14. Denergization of the drive motor 28 causes the centrifugal switch contacts 41, 42 to open, thereby assuring continued deenergization of the heater 22 even if the limit thermostat 29 retransfers to the condition wherein the contacts 30 and 31 thereof are closed.

Attention is invited to the fact that the holding circuit for the relay winding 43 is provided independently of any timer operated contacts; therefore, it will be noted that the door switch 37 must be opened in order to deenergize the relay winding 43. Thus, in order for the operator to restart the machine, it is necessary for her to first open and then close the access door 19, which will in turn open and close the contacts 38, 39 of the door switch 37.

Inasmuch as it is necessary for the operator to open and close the access door 19 in order to restart the machine, the operator will be immediately apprized of any serious condition causing the limit thermostat 29 to operate, such as a drum fire or a blocked air passageway. This provides the attendant advantage that the fabrics being dried in the machine will not suffer continued damage.

While the operation of the control circuit according to the invention has been described in combination with an electrically heated drying appliance, it is to be understood that the control circuit has equal utility in conjunction with gas heated drying appliances.

Many changes and modifications of the invention may become apparent to those skilled in the art without departing from the spirit and scope of the invention, and it is to be understood that we wish to include within the patent warranted hereon all such changes and modifications as may be reasonably and properly included within the scope of the appended claims.

The embodiments of the invention in which an exclusive property or privilege is claimed are defined as follows:

1. In a clothes drying appliance having a cabinet, a rotatable tumbling drum within said cabinet, a door in said cabinet providing selective access to said drum, means to circulate air through said drum, heating means to heat air being circulated through said drum, drive means coupled to said drum and said air circulating means, the improvement comprising a control circuit including means to deenergize said heating means and said drive means in response to temperatures above a predetermined temperature adjacent said heating means, said deenergizing means being connected in circuit with a switch operated by said access door whereby said door must be opened and re-closed to re-energize said heating means and drive means.

2. In a clothes drying appliance according to claim 1, wherein said means to deenergize said heating means and said drive means comprises a relay including a winding, normally closed contacts connected in series with said drive means, and normally open contacts connected between said switch means and said winding, and a thermostat disposed to sense the temperature adjacent the heating means, said thermostat including normally open contacts connected in circuit with said switch and said winding and operable to provide energization of said winding upon detection of temperatures above said predetermined temperature.

3. In a clothes drying appliance according to claim 2, wherein said control circuit comprises a centrifugal switch associated with said drive means including contacts serially connected in circuit with said heating means and closed only when said drive means is operating at speeds above a predetermined speed.

4. In a clothes drying appliance, a rotatable tumbling drum, a drive motor for rotating said drum, means for circulating air through said drum, heating means to heat the air being circulated through said drum, an access door for said drum, door switch means connected to said motor and operated by said access door to connect and disconnect said motor and an electrical supply, a relay having an energizing winding, normally closed relay contacts connected in series with said motor, normally open relay contacts connected between said energizing winding and said door switch means for establishing a holding circuit for said relay, and a heat responsive switch having contacts connected in circuit between said door switch means and said winding, said heat responsive switch being operable at temperatures above a predetermined temperature to effect sustained energization of said winding and deenergization of said motor until said door switch is operated sequentially open and then closed.

5. In a clothes drying appliance according to claim 4 wherein said heat responsive switch includes contacts normally closed at temperatures below said predetermined temperature, and a centrifugal switch connected in series with said normally closed contacts of said heat responsive switch and said heating means and said door switch means, said centrifugal switch being associated with said motor and closed at motor speeds above a predetermined speed.

6. In a clothes drying appliance according to claim 4, comprising a centrifugal switch connected in series with said heating means, said centrifugal switch being coupled to said drive motor and closed upon operation of said drive motor at speeds above a predetermined speed, and wherein said heat responsive switch includes a first fixed contact and a movable contact normally closed to said first fixed contact and interposed in the series circuit of said centrifugal switch and said heating means, and a second fixed contact connected to said winding for engagement by said movable contact in response to detection of temperatures above said predetermined temperature.

References Cited
UNITED STATES PATENTS 3,491,458    1/1970    Elders et al. _____ 34—45

CARROLL B. DORITY, JR., Primary Examiner